United States Patent
Liao

(10) Patent No.: US 6,811,162 B2
(45) Date of Patent: Nov. 2, 2004

(54) FRONT WHEEL ADJUSTING DEVICE FOR A GOLF CART

(75) Inventor: Gordon Liao, Tainan Hsien (TW)

(73) Assignee: Unique Product & Design Co., Ltd., Tainan Hsien (TW)

( * ) Notice: Subject to any disclaimer, the term of this patent is extended or adjusted under 35 U.S.C. 154(b) by 149 days.

(21) Appl. No.: 10/340,625

(22) Filed: Jan. 13, 2003

(65) Prior Publication Data

US 2004/0135331 A1 Jul. 15, 2004

(51) Int. Cl.[7] .............................. B62B 3/02; B62B 3/12
(52) U.S. Cl. ............................ 280/47.2; 280/DIG. 6; 280/47.21
(58) Field of Search ................... 280/43.13, 43.15, 280/43.21, 11.223, 42, 47.2, 47.21, 43, 47, 825, 826, 651, 652, 47.17, 64, 78, 47.22, DIG. 6, 299, 302, 79.2, 87.042, 276, 277; 301/125, 111.01, 111.05, 111.07; 16/44–46, 18 R

(56) References Cited

U.S. PATENT DOCUMENTS

| | | | | | |
|---|---|---|---|---|---|
| 1,548,973 A | * | 8/1925 | Beeler | ..................... | 280/87.01 |
| 2,040,121 A | * | 5/1936 | Bowen | ..................... | 16/44 |
| 3,462,171 A | * | 8/1969 | Mitty et al. | ............... | 280/47.26 |
| 3,618,970 A | * | 11/1971 | Frigaard | ................... | 280/87.01 |
| 4,403,784 A | * | 9/1983 | Gray | ....................... | 280/11.28 |
| 5,029,886 A | * | 7/1991 | Takahashi et al. | ..... | 280/93.504 |
| 5,400,469 A | * | 3/1995 | Simonsen | ..................... | 16/44 |
| 5,556,116 A | * | 9/1996 | Sloss et al. | ................. | 280/7.15 |
| 6,041,584 A | * | 3/2000 | Hohnl | ........................ | 56/17.2 |
| 6,409,190 B1 | * | 6/2002 | Tsai | ....................... | 280/87.041 |
| 6,416,063 B1 | * | 7/2002 | Stillinger et al. | ...... | 280/11.223 |
| 6,607,201 B2 | * | 8/2003 | Marshburn | ................... | 280/79 |
| 6,719,319 B2 | * | 4/2004 | Liao | ........................... | 280/654 |

* cited by examiner

Primary Examiner—Christopher P. Ellis
Assistant Examiner—Bridget Avery
(74) Attorney, Agent, or Firm—Bacon & Thomas PLLC

(57) ABSTRACT

A front wheel adjusting device for a golf cart includes a U-shaped support frame and a front wheel. The support frame has two parallel rods with inner ends respectively bored with a vertical groove. The front wheel has a shaft hole for a shaft to insert, which has its opposite ends respectively bored with a threaded hole. Two fixing members has a slide groove and a lengthwise straight groove, connected with the ends of the shaft, and a threaded rod is inserted in the straight groove of the fixing member and the threaded hole of the shaft and secured on the fixing member. Then, the two fixing members are respectively stuffed into the two parallel rods. Thus, turning the threaded rod can move up and down the shaft for adjusting the front wheel.

1 Claim, 6 Drawing Sheets

FRONT WHEEL ADJUSTING DEVICE FOR A GOLF CART

BACKGROUND OF THE INVENTION

This invention relates to a front wheel-adjusting device for a golf cart, particularly to one able to adjust an angle of the front wheel of a golf cart so as to enable it to run straightforward without being influenced by the topography of a golf course.

Generally, a golf cart has a front wheel and two rear wheels. The front wheel, as shown in FIGS. 1 and 2, includes a U-shaped support frame 20 and a front wheel 30 respectively fixedly assembled with a golf cart 10. The front wheel 30 fitted between the two parallel rods of the support frame 20 is pivotally assembled with the support frame 20 for rotating by means of a threaded rod 301 inserted through the shaft holes of the support frame 20 and the front wheel 30 and then locked. However, after used for a period of time, the unadjustable front wheel is liable to become deflected and unable to keep running straightforward in case a golf course is uneven.

SUMMARY OF THE INVENTION

The objective of this invention is to offer a front wheel-adjusting device for a golf cart, able to adjust the front wheel of a golf cart and keep it running straightforward, regardless of the topography of a golf course.

The front wheel-adjusting device for a golf cart in the present invention includes a U-shaped support frame and a front wheel fitted between two parallel rods of the support frame. The two parallel rods of the support frame have their ends respectively formed with a hollow interior and bored with a vertical groove in the inner side. The front wheel has its shaft hole inserted with a shaft which has its opposite ends protruding out of the shaft hole and respectively bored with a through inner threaded hole. The shaft has its opposite ends respectively fitted with a fixing member which is bored with a slide groove in one side facing the front wheel and a lengthwise through hole aligned to the inner threaded hole of the shaft. Thus, the two fixing members are respectively fitted with the outer ends of the shaft, letting the opposite ends of the shaft respectively located in the slide grooves of the two fixing members. Then, a properly long threaded rod is inserted upward through the lengthwise through hole of the fixing member and the inner threaded hole of the shaft, and then extending out of the topside of the fixing member and screwed with a nut. Next, the two fixing members are respectively stuffed into the two parallel rods of the support frame and fixed therein by bolts, letting the opposite ends of the shaft respectively positioned in the vertical grooves of the two parallel rods of the support frame. Thus, the opposite ends of the shaft are able to move up and down vertically along the threaded rod to adjust the front wheel of a golf cart by turning around the threaded rod.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
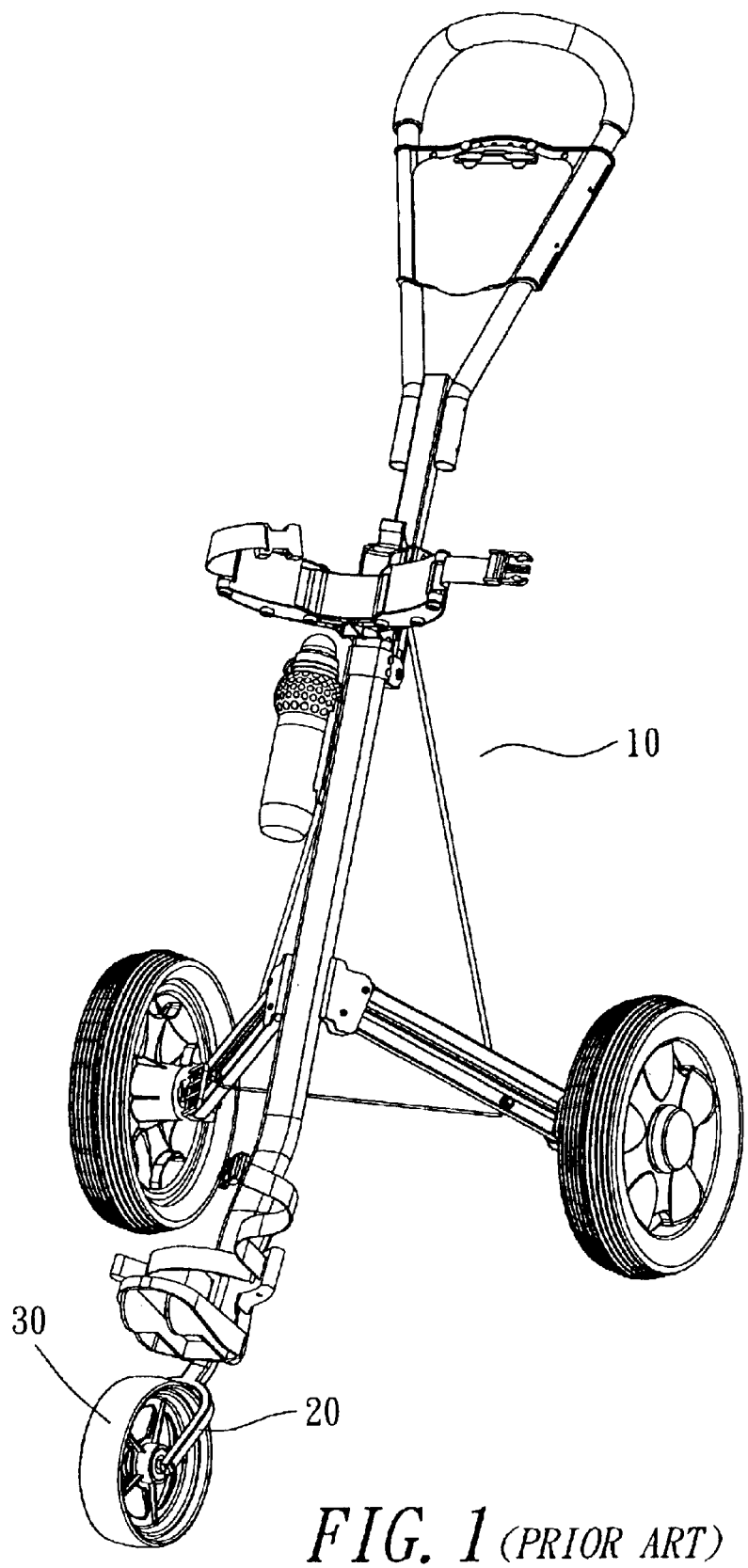
FIG. 1 is a perspective view of the front wheel of a conventional golf cart.
Figure 2:
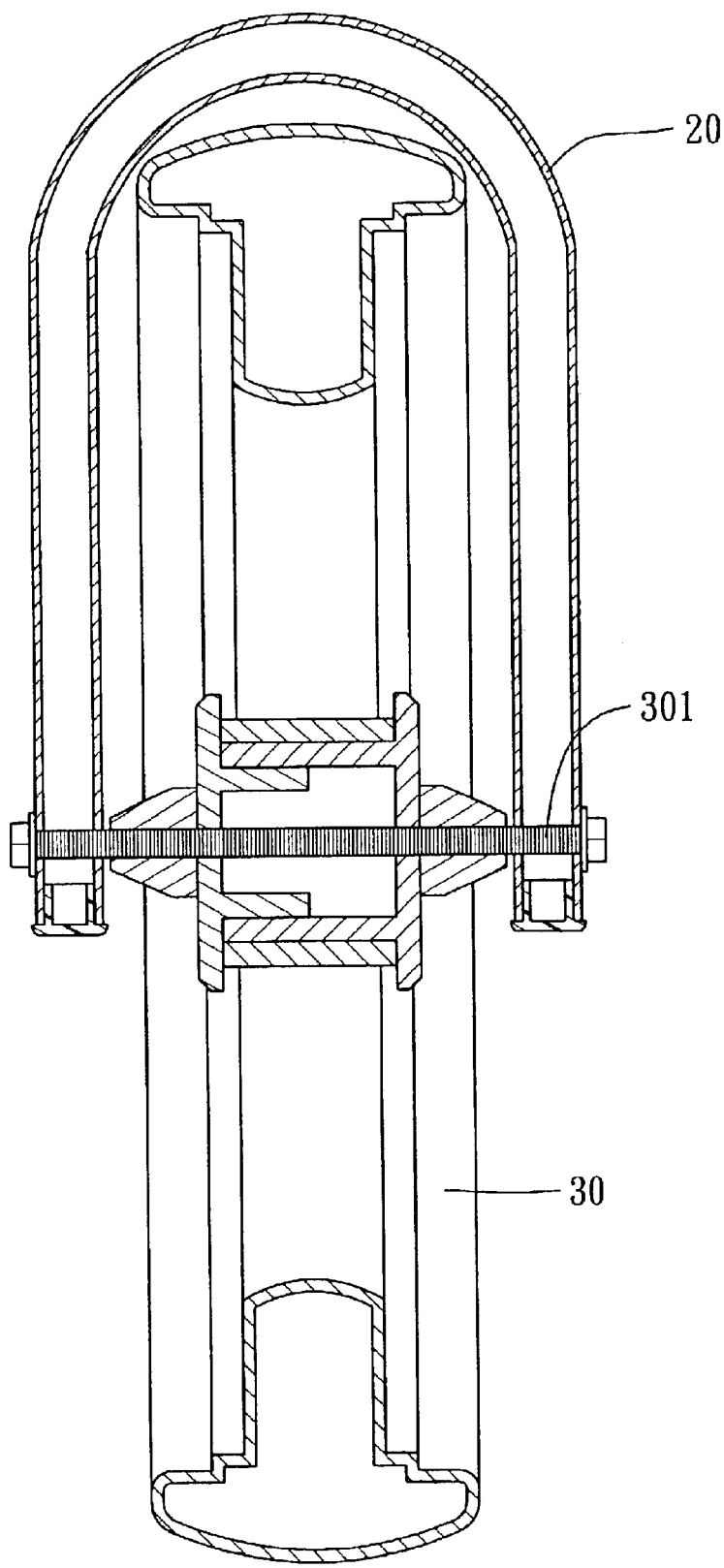
FIG. 2 is a cross-sectional view of the front wheel of the conventional golf cart.
Figure 3:
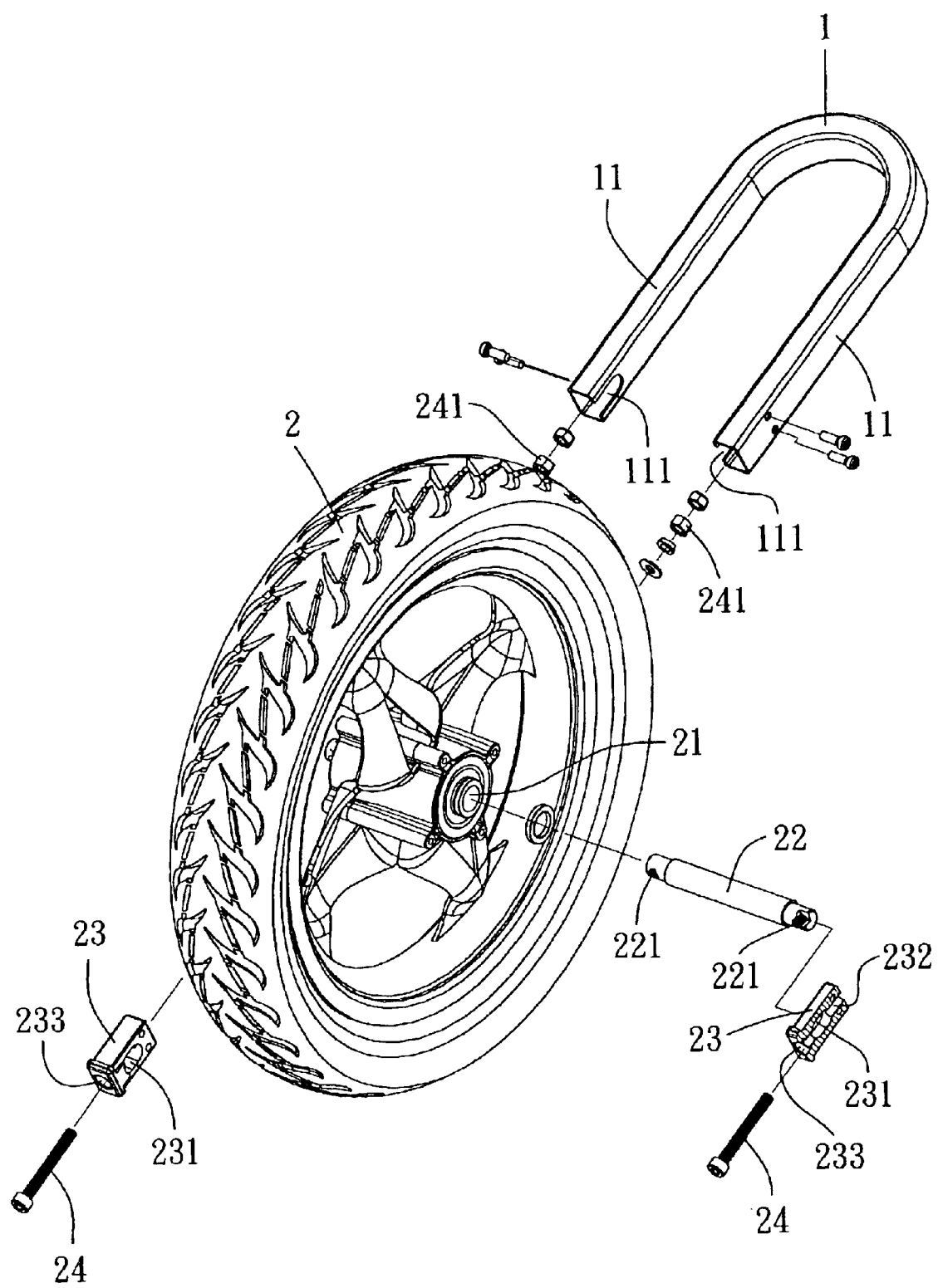
FIG. 3 is an exploded perspective view of a front wheel-adjusting device for a golf cart in the present invention.

A preferred embodiment of a front wheel-adjusting device for a golf cart in the present invention, as shown in FIG. 3, includes a U-shaped support frame 1 and a front wheel 2 as main components combined together.

The support frame 1 is formed with two parallel rods 11 having their ends respectively formed with a hollow interior and bored with a vertical groove 111 in the inner side.

The front wheel 2 fitted between the two parallel rods 11 of the support frame 1 has a shaft hole 21 for a shaft 22 to insert, which has its opposite ends respectively protruding out of the shaft hole 21 and bored with a through threaded hole 221. Two fixing member 23 are respectively fitted with the outer ends of the shaft 22, respectively having a slide groove 231 in one side facing the front wheel 2. Each fixing member 23 has a lengthwise straight groove 232 aligned to the threaded hole 221 of the shaft 22 and a recessed chamber 233 formed integral under the straight groove 232.

Figure 4:
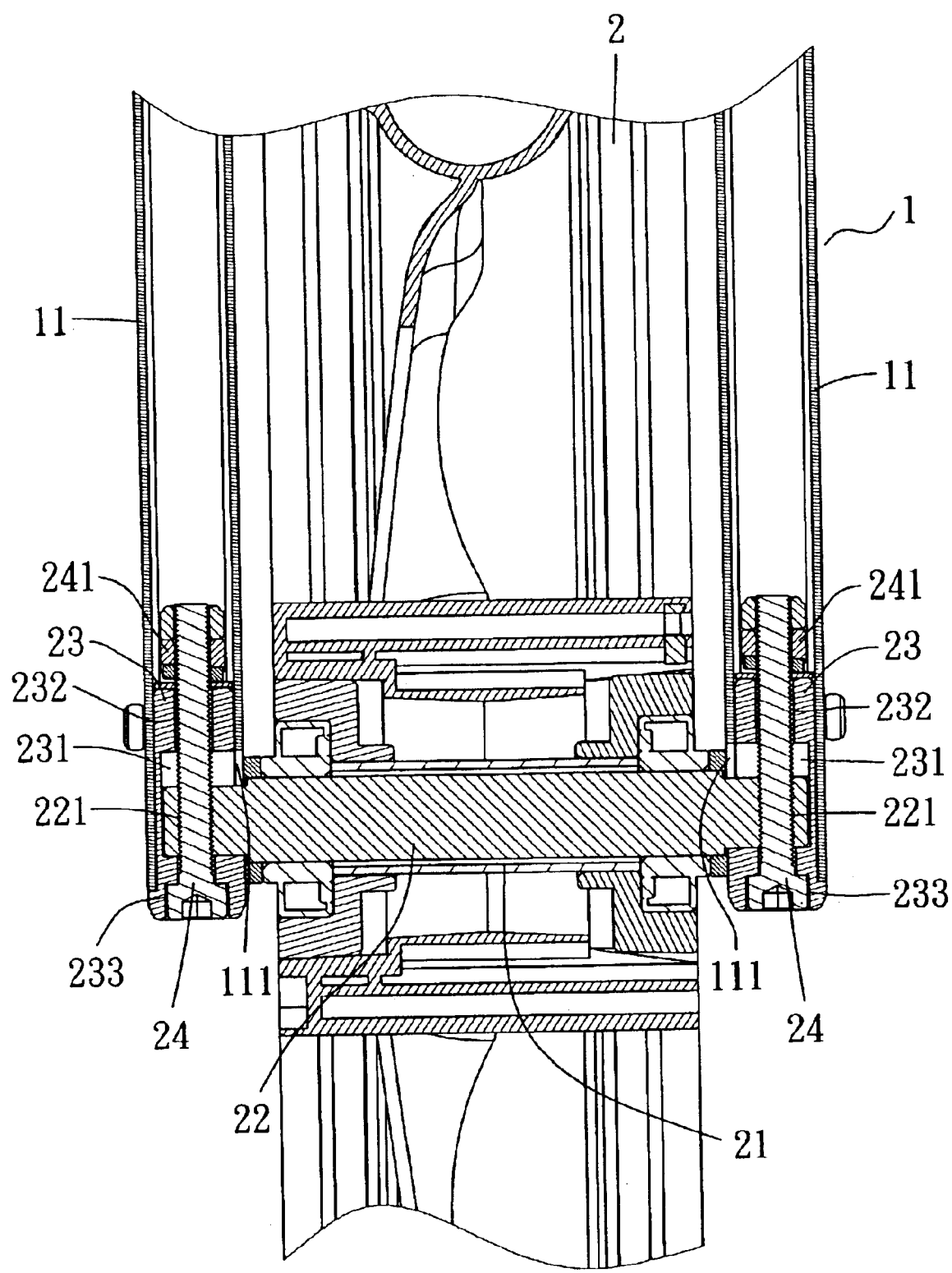
FIG. 4 is a cross-sectional view of the front wheel-adjusting device for a golf cart in the present invention.
Figure 5:
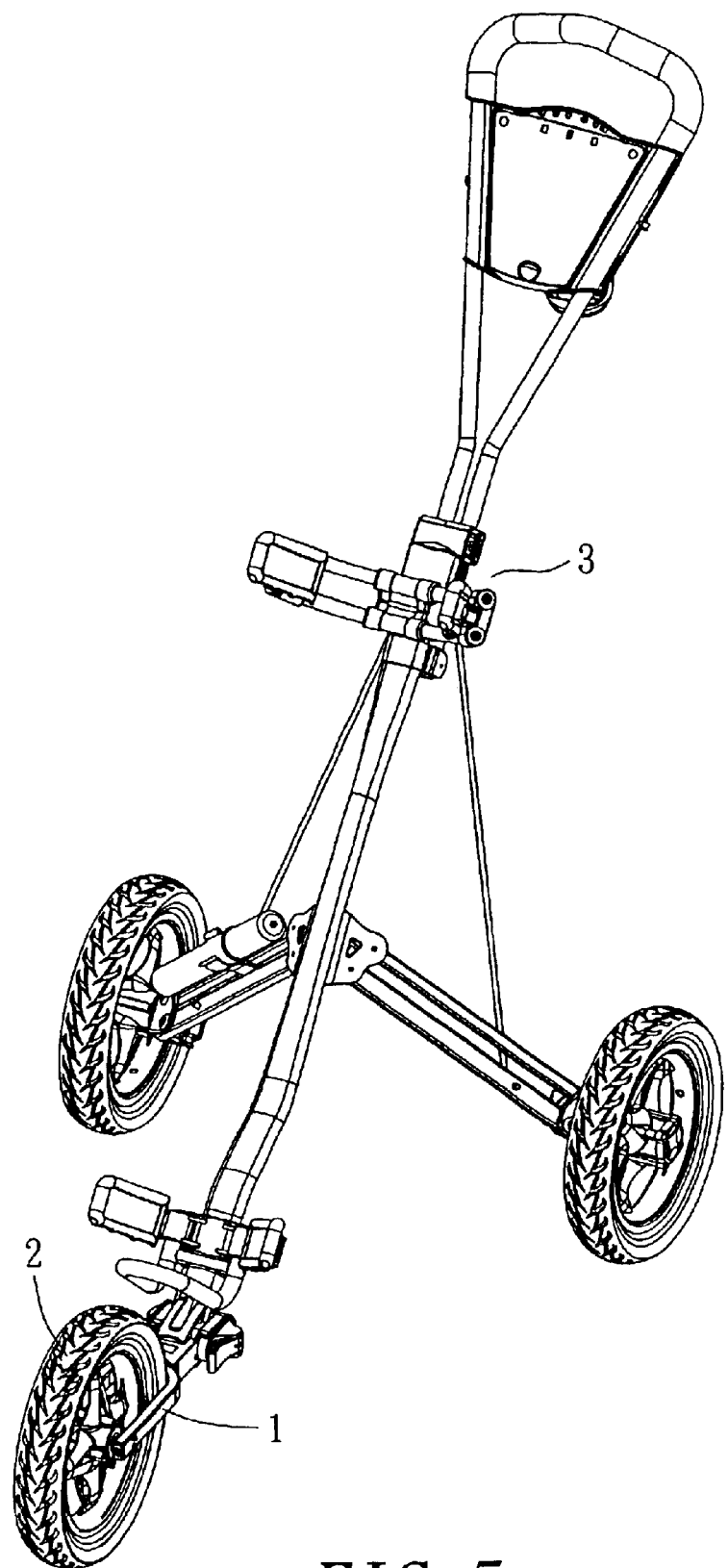
FIG. 5 is a perspective view of the front wheel-adjusting device for a golf cart in a used condition in the resent invention.

In assembling, as shown in FIG. 4, firstly, the shaft 22 is inserted in the shaft hole 21 of the front wheel 2 and has its opposite ends with the inner threaded holes 221 respectively protruding out of the shaft hole 21. Next, the two fixing members 23 are respectively fitted with the outer ends of the shaft 22, letting the two inner threaded holes 222 in the opposite ends of the shaft 22 respectively located in the slide grooves 231 of the fixing members 23. Then, a properly long threaded rod 24 is inserted upward in the lengthwise straight groove 232 of the fixing member 23 and the inner threaded hole 221 of the shaft 22 and then extending out of the topside of the fixing member 23 and screwed with a nut 241, letting the head of the threaded rod 24 received in the recessed chamber 233 of the fixing member 23. Subsequently, the two fixing members 23 are respectively stuffed into the two parallel rods 11 of the support frame 1 and fixed therein by bolts 112, letting the opposite ends of the shaft 22 respectively fitting in the vertical grooves 111 of the parallel rods 11 to finish assembly of the front wheel adjusting device. Lastly, the finished front wheel-adjusting device has the support frame 2 assembled on the front end of the framework of a golf cart 3, as shown in FIG. 5.

Figure 6:
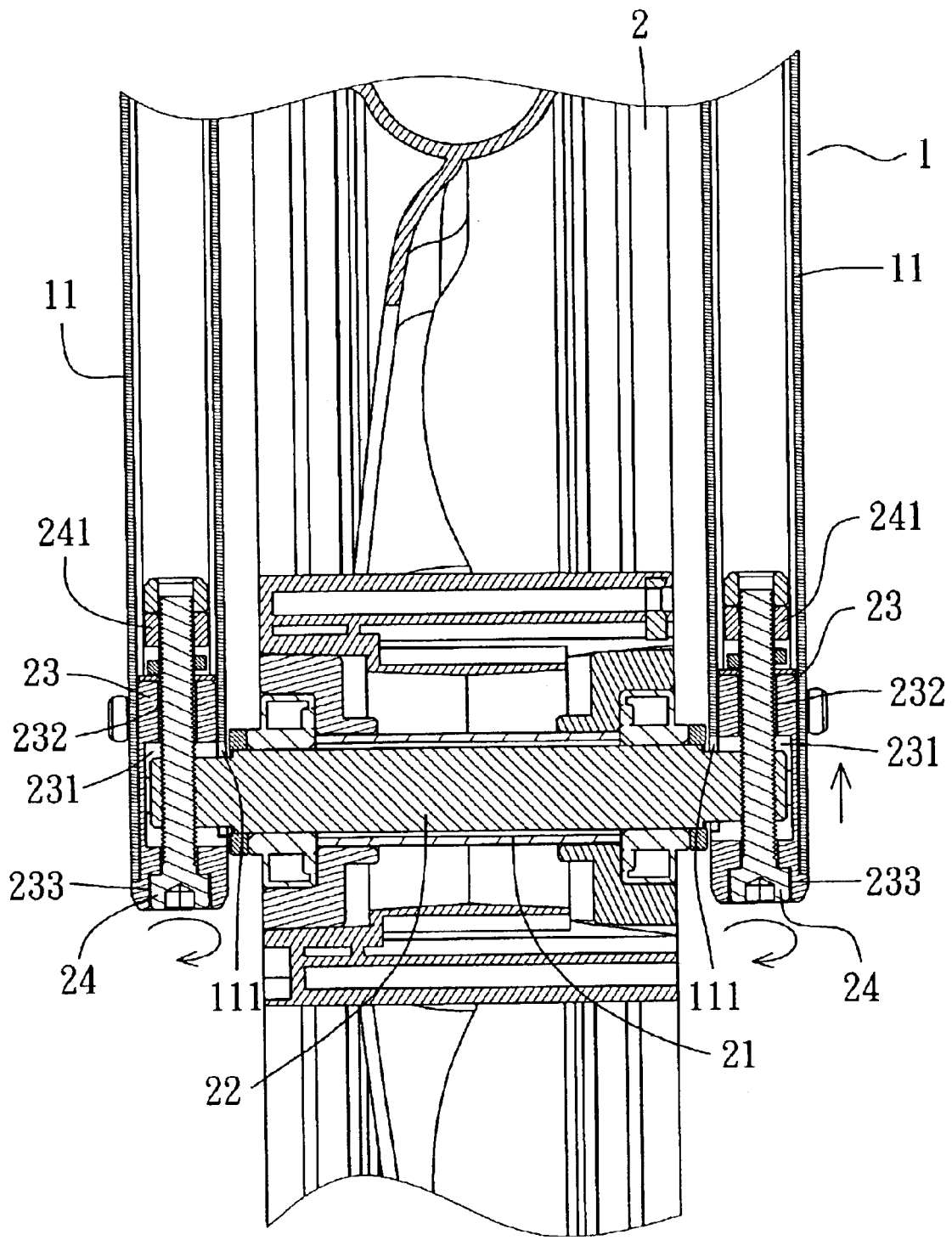
FIG. 6 is a cross-sectional view of the front wheel-adjusting device for a golf cart in an adjusted condition in the present invention.

In using, after the golf cart 3 is used for a period of time, and its front wheel becomes deflected and unable to go straightforward, only rotate the threaded rod 24 with a simple tool (like an inner hexagonal spanner) to let the threaded rod 24 rotate idly in the through hole 232 of the fixing member 23 and actuate the shaft 22 to move up and down vertically along the threaded rod 24, as shown in FIG. 6, because the inner threaded hole 221 in the opposite ends of the shaft 22 are meshed with the threaded rod 24. Synchronously, the shaft 22 actuates and adjusts the front wheel of the golf cart 3 to a correct angle to enable the golf cart to go straightforward again.

While the preferred embodiment of the invention has been described above, it will be recognized and understood that various modifications may be made therein and the appended claims are intended to cover all such modifications that may fall within the spirit and scope of the invention.

I claim:

1. A front wheel adjusting device for a golf cart comprising a U-shaped support frame and a front wheel, said support frame formed with two parallel rods, said two parallel rods having ends respectively formed with a hollow interior, each said parallel rod having an inner end bored with a vertical groove, said front wheel positioned between said two parallel rods of said support frame, said front wheel having a shaft hole inserted with a shaft, said shaft having opposite ends protruding out said shaft hole and respectively bored with an inner threaded hole, two fixing members respectively fitted with the outer ends of said shaft, each said fixing member bored with a slide groove in one side facing said front wheel, each said fixing member formed inside with a lengthwise through hole aligned to said inner threaded hole of said shaft, said two fixing members respectively fitted with the outer ends of said shaft, said shaft having opposite ends respectively positioned in said slide grooves of said two fixing members, a threaded rod inserted upward in said lengthwise straight groove of said fixing member and said inner threaded hole of said shaft, said threaded rod having an upper end protruding out of the topside of said fixing member and fixed thereon, said two fixing members respectively stuffed into and fixed with said two parallel rods of said support frame, said shaft having the opposite ends respectively fitting in said vertical grooves of said parallel rods, said threaded rod being rotated to let said shaft move up and down vertically along said threaded rod in said vertical grooves of said parallel rods and said slide grooves of said fixing members so as to adjust the front wheel of a golf cart.

* * * * *